US011525960B2

United States Patent
Shimakawa

(10) Patent No.: US 11,525,960 B2
(45) Date of Patent: Dec. 13, 2022

(54) OPTICAL FIBER MODULE AND OPTICAL SWITCH

(71) Applicant: SUMITOMO ELECTRIC INDUSTRIES, LTD., Osaka (JP)

(72) Inventor: Osamu Shimakawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 301 days.

(21) Appl. No.: 17/070,369

(22) Filed: Oct. 14, 2020

(65) Prior Publication Data

US 2021/0124124 A1    Apr. 29, 2021

(30) Foreign Application Priority Data

Oct. 23, 2019   (JP) .............. JP2019-192888

(51) Int. Cl.
| G02B 6/35 | (2006.01) |
| G02B 6/36 | (2006.01) |
| G02B 6/02 | (2006.01) |
| G02B 26/08 | (2006.01) |

(52) U.S. Cl.
CPC ....... *G02B 6/3518* (2013.01); *G02B 6/02042* (2013.01); *G02B 6/3616* (2013.01); *G02B 26/0833* (2013.01)

(58) Field of Classification Search
CPC .............. G02B 6/3518; G02B 6/02042; G02B 6/3616; G02B 6/0833
USPC .......................................................... 385/18
See application file for complete search history.

(56) References Cited

U.S. PATENT DOCUMENTS

| 2008/0267567 A1* | 10/2008 | Saito | G02B 6/3803 385/95 |
| 2011/0142402 A1* | 6/2011 | Tachikura | G02B 6/2551 264/1.25 |
| 2012/0219254 A1* | 8/2012 | Bradley | G02B 6/3885 29/407.09 |
| 2019/0331861 A1* | 10/2019 | Shimakawa | G02B 6/403 |
| 2020/0083659 A1* | 3/2020 | Reeves-Hall | H01S 3/1301 |
| 2020/0284988 A1* | 9/2020 | Tanaka | G02B 6/3556 |

(Continued)

FOREIGN PATENT DOCUMENTS

| JP | 2004-070050 A | 3/2004 |
| JP | 2014-228742 A | 12/2014 |

OTHER PUBLICATIONS

Ford et al.; "1 – N Fiber Bundle Scanning Switch"; IEEE Photonics Technology Letters; Jul. 1998; vol. 10; pp. 967-969.

*Primary Examiner* — Jerry M Blevins
(74) *Attorney, Agent, or Firm* — Oliff PLC

(57) ABSTRACT

An optical fiber module is disclosed. The optical fiber module includes a first optical fiber as an MCF, a plurality of second optical fibers as MCFs, a first unit, and a second unit. The first unit has an hole holding the first optical fiber and a plurality of holes respectively holding the second optical fibers. These holes are independent of each other. Each optical fiber has a first part and a second part. An outer surface of a cladding of the first part is coated with a resin. An outer surface of a cladding of the second part is exposed from the resin. The first unit holds the first part. The second unit holds the second part. A boundary between the first part and the second part is positioned in a space between the first unit and the second unit.

16 Claims, 14 Drawing Sheets

(56) References Cited

U.S. PATENT DOCUMENTS

2021/0033802 A1* 2/2021 Morishima .......... G02B 6/3885
2022/0182741 A1* 6/2022 Jinno .................. G02B 6/3548

* cited by examiner

OPTICAL FIBER MODULE AND OPTICAL SWITCH

CROSS REFERENCE

This application claims priority based on Japanese Application No. 2019-192888 filed on Oct. 23, 2019, and incorporates all the contents described in the above Japanese application.

TECHNICAL FIELD

The present disclosure relates to an optical fiber module and an optical switch.

BACKGROUND

JP2004-70050A discloses a technique relating to an optical switch. This optical switch includes first to fourth optical fibers, a capillary, a collimating lens, a plane micro mirror, and a tilting unit. In the capillary, the first to fourth optical fibers are arranged in line symmetry and in parallel on the same plane. The collimating lens is placed close to the capillary. The collimating lens converts the light that is exited from the optical fiber of the capillary into parallel light, focuses the light on a predetermined focal position, and focuses incident parallel light on the optical fiber. The plane micro mirror reflects the light passing through the collimating lens. The tilting unit tilts the angle of the plane micro mirror by a predetermined angle. Switching between a first state and a second state occurs by the tilting unit changing the angle of the plane micro mirror. In the first state, the first and third optical fibers and the second and fourth optical fibers are optically coupled with each other. In the second state, the first and third optical fibers are optically coupled with each other.

JP2014-228742A discloses a technique relating to a capillary for holding an optical fiber. This capillary holding an optical fiber accommodates, in a through hole, an optical fiber bundle in which a plurality of optical fibers having substantially the same radial cross-sectional shape are arranged in longitudinal and lateral directions. At least one optical fiber comes into contact with two optical fibers adjacent to each other and positioned above or below the optical fiber in the longitudinal direction. The lowermost optical fiber in the longitudinal direction comes into contact with the bottom wall surface of the through hole. The uppermost optical fiber in the longitudinal direction comes into contact with the ceiling wall surface of the through hole substantially parallel to the bottom wall surface.

Paper 1 (Joseph E. Ford and David J. DiGiovanni, "1×N Fiber Bundle Scanning Switch", IEEE Photonics Technology Letters, Vol. 10, No. 7, July 1998) discloses a technique relating to an optical switch. This optical switch includes a fiber bundle and a variable-angle plane mirror. The fiber bundle is formed by a plurality of optical fibers being bundled in a ferrule. The plane mirror selectively reflects the light that is exited from one optical fiber to any other optical fiber. A lens is provided between the optical fibers and the mirror.

SUMMARY

The present disclosure provides an optical fiber module. This optical fiber module includes a first optical fiber, a plurality of second optical fibers, a first holding unit, and a second holding unit. The first optical fiber is a multi-core optical fiber (MCF). The second optical fiber is an MCF and extends along the first optical fiber. The first holding unit has a first hole and a plurality of second holes. The first hole holds the first optical fiber through an adhesive. The second holes hold the second optical fibers through an adhesive, respectively. The first hole is independent of the second holes. The second holes are independent of each other. A second holding unit is placed between the first holding unit and end faces of the first and second optical fibers. A second holding unit holds the first optical fiber and the second optical fibers. A second holding unit exposes the end faces of the first and the second optical fibers at one end. The second holding unit has a third hole collectively holding the second optical fibers through an adhesive. Each of the first and second optical fibers has a first part and a second part positioned between the end face and the first part. An outer surface of a cladding of the first part is coated with a resin. An outer surface of a cladding of the second part is not coated by the resin. The first holding unit holds the first part. The second holding unit holds the second part. A space is provided between the first holding unit and the second holding unit. A boundary between the first part and the second part is positioned in the space. The first part of the first optical fiber is separated from the first parts of the second optical fibers in the space. The first parts of the second optical fibers are separated from each other in the space. Positions of the cores of the first optical fiber on the end face are 180° rotationally symmetrical to positions of the cores of each of the second optical fibers on the end face.

DETAILED DESCRIPTION

Figure 1:
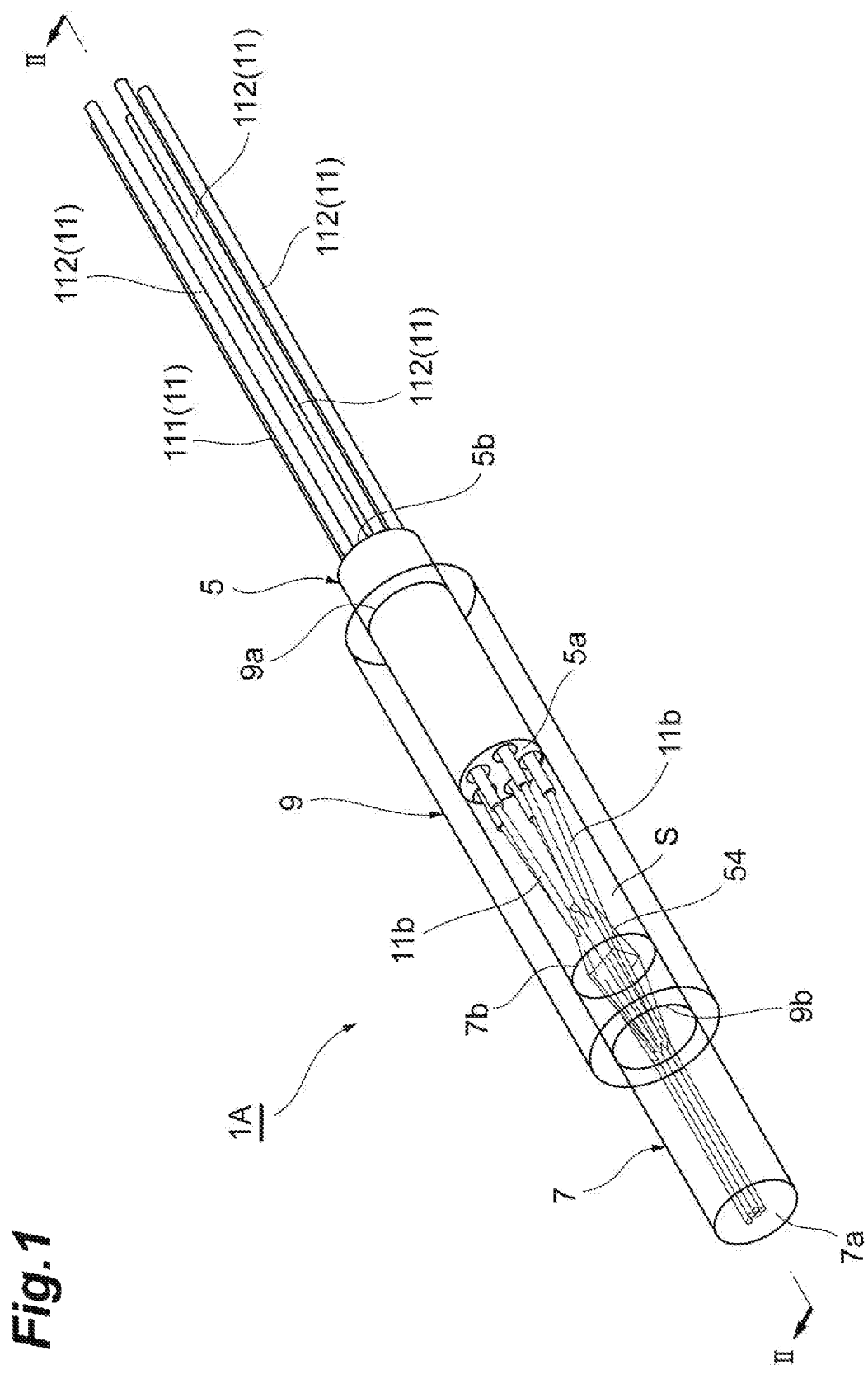
FIG. 1 is a perspective view illustrating the appearance of an optical fiber module according to an embodiment.

Problem to be Solved by Present Disclosure

An optical switch of a certain type includes a light reflection unit and a plurality of optical fibers bundled with end faces aligned. The light reflection unit has a variable-angle light reflection surface placed so as to face the end faces of the optical fibers thorough a lens. The light reflection surface selectively reflects the light that is exited from the end face of one optical fiber toward the end face of any other optical fiber. Such an optical switch is disclosed in, for example, Paper 1. In such an optical switch, the maximum distance between the cores of optical fibers increases as the number of the optical fibers increases and a larger angle is required for the reflection unit. Increasing the angle means increasing the amount of change in the angle of the light reflection surface. However, in this type, the angle of the light reflection surface is often made variable by means of a fine structure such as MEMS. In that case, it is difficult to increase the variable angle range of the light reflection surface. Accordingly, in order to realize a larger number of channels, it is necessary to minimize the distances between optical fiber cores and arrange a large number of cores in a narrow area.

In this regard, it is one idea to use a multi-core optical fiber (MCF) having a plurality of cores. For example, in a case where M MCFs are bundled with each having N cores, the core density per unit area can be increased and the maximum inter-core distance can be reduced as compared with a case where (M×N) single-core optical fibers (SCFs) are bundled. In other words, it is possible to place a larger number of cores while maintaining the maximum inter-core distance. Accordingly, a larger number of channels can be realized.

However, such a method using the MCF entails the following problem. The MCF has at least one core at a position deviating from the central axis unlike the SCF, which has only one core on the central axis. Accordingly, in a case where the MCF is used for an optical switch, it is necessary to adjust the rotation angle of the MCF around the central axis. However, when a plurality of MCFs are bundled, the resin coatings of the MCFs come into contact with each other. As a result, when the rotation angle of a MCF is adjusted, an already adjusted MCF adjacent to the MCF also rotates due to the friction between the resin coatings. This leads to an increase in the complexity of the work of individually adjusting the rotation angles of the MCFs. On the other hand, removal of the resin coating over a long section may lead to a breaking of the MCFs.

Effect of Present Disclosure

According to the present disclosure, it is possible to facilitate the work of individually adjusting the rotation angles of the MCFs in an optical fiber module having a configuration in which the MCFs are bundled for an optical switch.

DESCRIPTION OF EMBODIMENT OF PRESENT DISCLOSURE

First, an embodiment of the present disclosure will be listed and described. An optical fiber module according to one embodiment includes a first optical fiber, a plurality of second optical fibers, a first holding unit, and a second holding unit. The first optical fiber is a multi-core optical fiber (MCF). The second optical fiber is an MCF and extends along the first optical fiber. The first holding unit has a first hole and a plurality of second holes. The first hole holds the first optical fiber through an adhesive. The second holes hold the second optical fibers through an adhesive, respectively. The first hole is independent of the second holes. The second holes are independent of each other. A second holding unit is placed between the first holding unit and end faces of the first and second optical fibers. A second holding unit holds the first optical fiber and the second optical fibers. A second holding unit exposes the end faces of the first and the second optical fibers at one end. The second holding unit has a third hole collectively holding the second optical fibers through an adhesive. Each of the first and second optical fibers has a first part and a second part positioned between the end face and the first part. An outer surface of a cladding of the first part is coated with a resin. An outer surface of a cladding of the second part is exposed from the resin. The first holding unit holds the first part. The second holding unit holds the second part. A space is provided between the first holding unit and the second holding unit. A boundary between the first part and the second part is positioned in the space. The first part of the first optical fiber is separated from the first parts of the second optical fibers in the space. The first parts of the second optical fibers are separated from each other in the space. Position of the cores of the first optical fiber on the end face are 180° rotationally symmetrical to positions of the cores of each of the second optical fibers on the end face.

In this optical fiber module, the optical fibers are held in the holes, which are independent in the first holding unit. Further, the boundary between the first part coated with the resin and the second part where the cladding is exposed from the resin is positioned in the space provided between the first holding unit and the second holding unit. Further, in the space, the first parts of the first optical fiber and the second optical fibers are separated from each other. Accordingly, it is possible to avoid the adjacent optical fiber rotating due to the friction between the resin when the rotation angles of the optical fibers are adjusted. Accordingly, the work of individually adjusting the rotation angles of the optical fibers can be facilitated. In addition, the second parts where the cladding is exposed from the resin, that is, bare fiber parts are collectively held in the third hole of the second holding unit. Accordingly, it is possible to realize a larger number of channels by reducing the distance between the cores of the optical fibers and disposing a large number of cores in a narrow area.

Further, in this optical fiber module, the positions of the cores on the end face of the first optical fiber are 180° rotationally symmetrical to the positions of the cores on end face of each second optical fiber. As a result, optical switching can be suitably operated by the cores of the first optical fiber and the cores of each second optical fiber corresponding to each other.

The optical fiber module described above may further include a member interconnecting the first holding unit and the second holding unit. In this case, the space between the first holding unit and the second holding unit can be easily formed.

In the optical fiber module described above, the member may include a tubular part. The first holding unit is inserted and fixed in one opening of the tubular part. The second holding unit is inserted and fixed in the other opening of the tubular part. In this case, the space between the first holding unit and the second holding unit is surrounded by the tubular part. Accordingly, it is possible to effectively protect the optical fibers arranged in the space, particularly the second part with the cladding exposed from the resin.

In the optical fiber module described above, the first holding unit may further have a connecting part to connect with the second holding unit. Also in this case, the space between the first holding unit and the second holding unit can be easily formed.

In the optical fiber module described above, the connecting part may have a tubular shape surrounding the space. The second holding unit is inserted and fixed in an opening of the connecting part. In this case, the space between the first holding unit and the second holding unit is surrounded by the connecting part. Accordingly, it is possible to effectively protect the optical fibers arranged in the space, particularly the second parts with the cladding exposed from the resin.

In the optical fiber module described above, each of the first and second optical fibers may further have a third part where the outer surface of the cladding is exposed from the resin. The third part of the first optical fiber is positioned in the first hole. The third part of the second optical fiber is positioned in the second hole. In this case, the outer surface of the cladding of each of the optical fibers can be fixed to the holes not by the resin but directly. Accordingly, the position of each core can be reliably fixed regardless of a shortage of close contact between the resin and the cladding.

In the optical fiber module described above, the first holding unit may have optical transparency. Further, the adhesive applied between the first optical fiber and the first hole and between the second optical fibers and the second holes may be an ultraviolet-curable adhesive or a visible light-curable adhesive. In this case, the adhesive can be irradiated with ultraviolet rays or visible light through the first holding unit. Accordingly, the optical fibers can be easily bonded and fixed in the holes.

In the optical fiber module described above, the second holding unit may have optical transparency. Further, the adhesive applied between the second optical fibers and the third hole may be an ultraviolet-curable adhesive or a visible light-curable adhesive. In this case, the adhesive can be irradiated with ultraviolet rays or visible light through the second holding unit. Accordingly, the optical fibers can be easily bonded and fixed in the holes.

An optical switch according to an embodiment includes the optical fiber module according to any of the above and a light reflection unit. The light reflection unit is configured to be variable in angle. The light reflection unit selectively reflects light exited from each core on the end face of the first optical fiber toward each core on the end face of any one of the second optical fibers. This optical switch includes the optical fiber module according to any of the above, and thus it is possible to facilitate the work of individually adjusting the rotation angle of each optical fiber.

DETAILS OF EMBODIMENT OF PRESENT DISCLOSURE

Specific examples of the optical fiber module and the optical switch of the present disclosure will be described below with reference to the drawings. It should be noted that the present invention is not limited to these exemplifications, is defined by the claims, and is intended to include every modification within the meaning and range equivalent to the claims. In the following description, the same elements in the description of the drawings will be denoted by the same reference symbols without redundant description.

Figure 2:
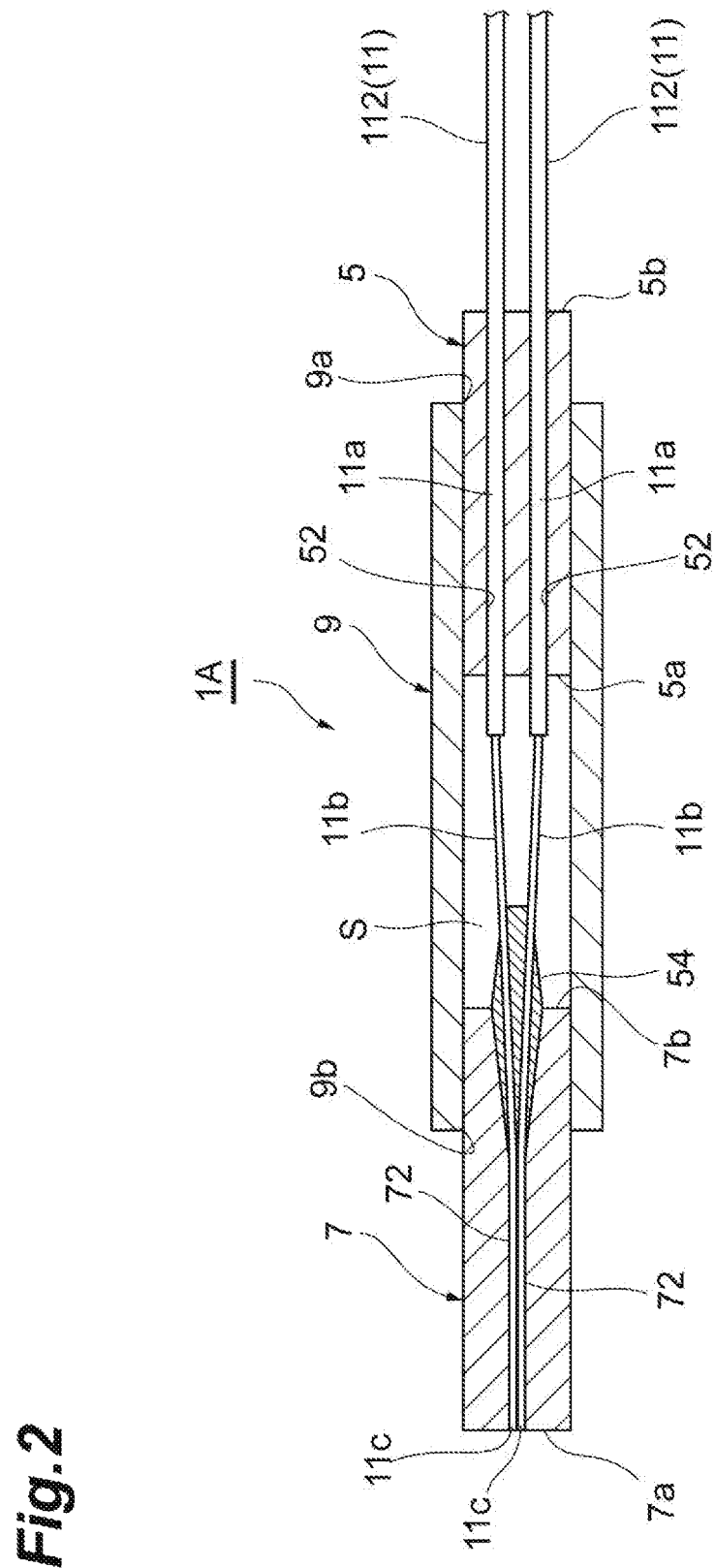
FIG. 2 is a cross-sectional view taken along line II-II illustrated in FIG. 1 and illustrates a cross section of the optical fiber module along the extending direction of optical fibers.

FIG. 1 is a perspective view illustrating the appearance of an optical fiber module 1A according to an embodiment. FIG. 2 is a cross-sectional view taken along line II-II illustrated in FIG. 1. FIG. 2 illustrates a cross section of the optical fiber module 1A along the extending direction of optical fibers. As illustrated in FIGS. 1 and 2, the optical fiber module 1A includes a plurality of optical fibers 11 that are MCFs, a holding unit 5, a holding unit 7, and a connecting member 9. The holding unit 5 corresponds to the first holding unit in the present disclosure. The holding unit 7 corresponds to the second holding unit in the present disclosure.

Figure 3A:
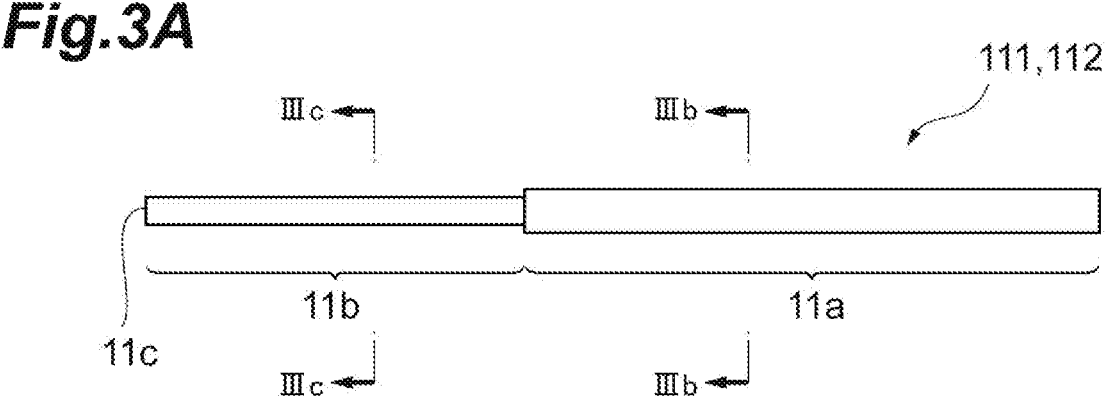
FIG. 3A is a side view of the optical fibers.
Figure 3B:
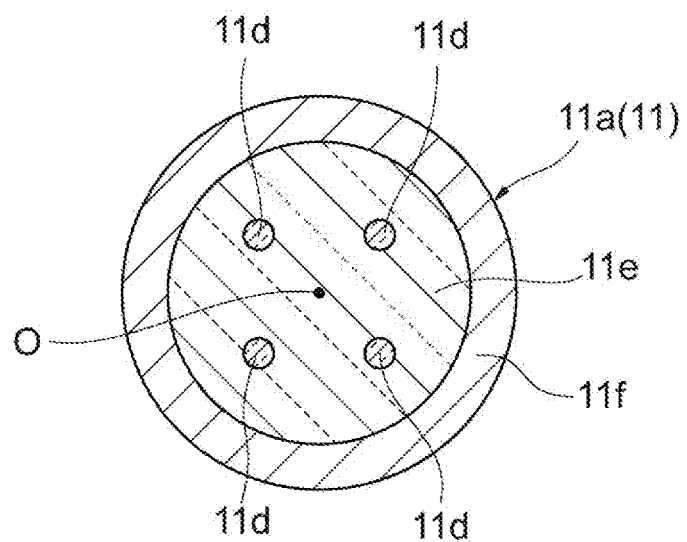
FIG. 3B is a cross-sectional view taken along line IIIb-IIIb illustrated in FIG. 3A and illustrates a cross section perpendicular to the extending direction of a coated fiber part.
Figure 3C:
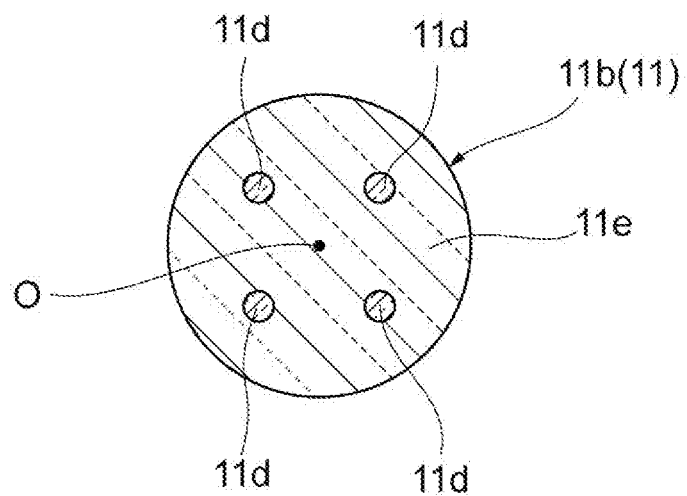
FIG. 3C is a cross-sectional view taken along line IIIc-IIIc illustrated in FIG. 3A and illustrates a cross section perpendicular to the extending direction of a bare fiber part.

The optical fibers 11 include one optical fiber 111 and a plurality of optical fibers 112 extending along the optical fiber 111. The optical fiber 111 corresponds to the first optical fiber in the present disclosure. The optical fibers 112 correspond to the second optical fibers in the present disclosure. FIG. 3A is a side view of the optical fibers 111 and 112. Each of the optical fibers 111 and 112 has a coated fiber part 11a and a bare fiber part 11b positioned between a end face 11c and the coated fiber part 11a. The coated fiber part 11a corresponds to the first part in the present disclosure. The bare fiber part 11b corresponds to the second part in the present disclosure. In one example, the bare fiber part 11b includes the end face 11c. FIG. 3B is a cross-sectional view taken along line IIIb-IIIb illustrated in FIG. 3A. FIG. 3B illustrates a cross section perpendicular to the extending direction of the coated fiber part 11a. FIG. 3C is a cross-sectional view taken along line IIIc-IIIc illustrated in FIG. 3A. FIG. 3C illustrates a cross section perpendicular to the extending direction of the bare fiber part 11b.

As illustrated in FIG. 3B, the coated fiber part 11a has a plurality of cores 11d, a cladding 11e, and a resin 11f. The core 11d has a circular cross-sectional shape. The cladding 11e has a circular cross-sectional shape and surrounds the cores 11d. The resin 11f covers the outer surface of the cladding 11e. As illustrated in FIG. 3C, the bare fiber part 11b has the cores 11d and the cladding 11e without having the resin 11f. In other words, the resin 11f is removed from the bare fiber part 11b.

The number of the cores 11d is any number. In the drawing, four cores 11d are illustrated as an example. These cores 11d are placed at equal distances on a circle centered on a central axis O of the optical fiber 111 or 112. The core 11d may be further placed on the central axis O. The diameter of each core 11d is, for example, 9.0 μm. The mode field diameter of each core 11d at a wavelength of 1.31 μm is, for example, 9.2 μm. The cross-sectional shape of the cladding 11e is a circle centered on the central axis O. The refractive index of the cladding 11e is smaller than the refractive index of each core 11d. In one example, the core 11d and the cladding 11e are made of glass. The diameter of the cladding 11e is, for example, 125 μm. The outer surface of the cladding 11e is exposed from the resin 11f in the bare fiber part 11b. The outer surface of the cladding 11e constitutes the outermost surface of the bare fiber part 11b. The resin 11f completely covers the outer surface of the cladding 11e over the entire circumference in the coated fiber part 11a. The thickness of the resin 11f is, for example, 62 μm. The resin 11f may be mainly composed of a resin material such as acrylic. The outer surface of the resin 11f constitutes the outermost surface of the coated fiber part 11a.

Figure 4:
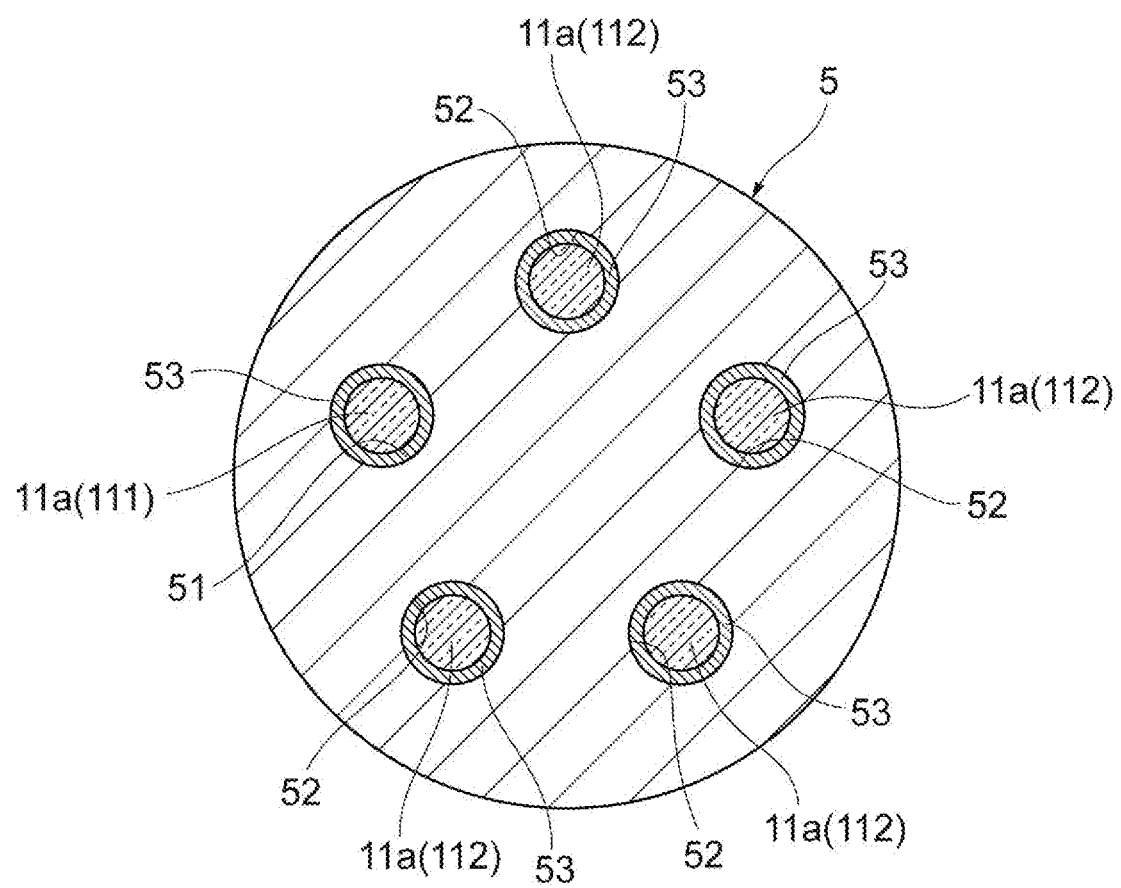
FIG. 4 is a diagram illustrating a cross section perpendicular to the extending direction of a holding unit.

Referring back to FIGS. 1 and 2, the holding unit 5 is a columnar member extending in the extending direction of the optical fibers 11. The holding unit 5 holds the coated fiber parts 11a of the optical fibers 11. FIG. 4 is a diagram illustrating a cross section perpendicular to the extending direction of the holding unit 5. As illustrated in FIG. 4, the holding unit 5 has a hole 51 and a plurality of holes 52. The hole 51 holds the coated fiber part 11a of the optical fiber 111. The holes 52 hold the coated fiber parts 11a of the optical fibers 112, respectively. The hole 51 corresponds to the first hole in the present disclosure. The hole 52 corresponds to the second hole in the present disclosure. The hole 51 is formed apart from and independently of the holes 52. The holes 52 are formed apart from and independently of each other. The holes 51 and 52 penetrate between a front end surface 5a and a rear end surface 5b of the holding unit 5 in the extending direction (see FIG. 2 as to each of the front end surface 5a and the rear end surface 5b). Each of the holes 51 and 52 has, for example, a circular cross-sectional shape. The inner diameters of the holes 51 and 52 are, for example, within the range of 1.1 times to 1.3 times the outer diameter of the coated fiber part 11a.

The coated fiber part 11a of the optical fiber 111 is fixed to the hole 51 through an adhesive 53. Each of the coated fiber parts 11a of the optical fibers 112 is fixed to each hole 52 through an adhesive 53. The optical fibers 111 and 112 are held in the holding unit 5 by the resin 11f (see FIG. 3B) being fixed to the inside surfaces of the holes 51 and 52 by the adhesive 53 in a portion in the direction of extension. The adhesive 53 is an ultraviolet-curable adhesive or a visible light-curable adhesive. In that case, the holding unit 5 may have optical transparency so that the adhesive 53 is easily irradiated with visible light or ultraviolet rays having a wavelength of, for example, 300 nm to 400 nm. In the present disclosure, having optical transparency means, for example, the property of transmitting 30% or more of ultraviolet rays and/or visible light. Alternatively, the adhesive 53 may be a thermosetting adhesive or a room temperature natural curing-type adhesive. The holding unit 5 is made of, for example, glass or resin such as plastic. In a case where the adhesive 53 is an ultraviolet-curable adhesive, the holding unit 5 is made of glass, for example. In a case where the adhesive 53 is a visible light-curable adhesive, the holding unit 5 is made of glass or transparent resin, for example.

Figure 5:
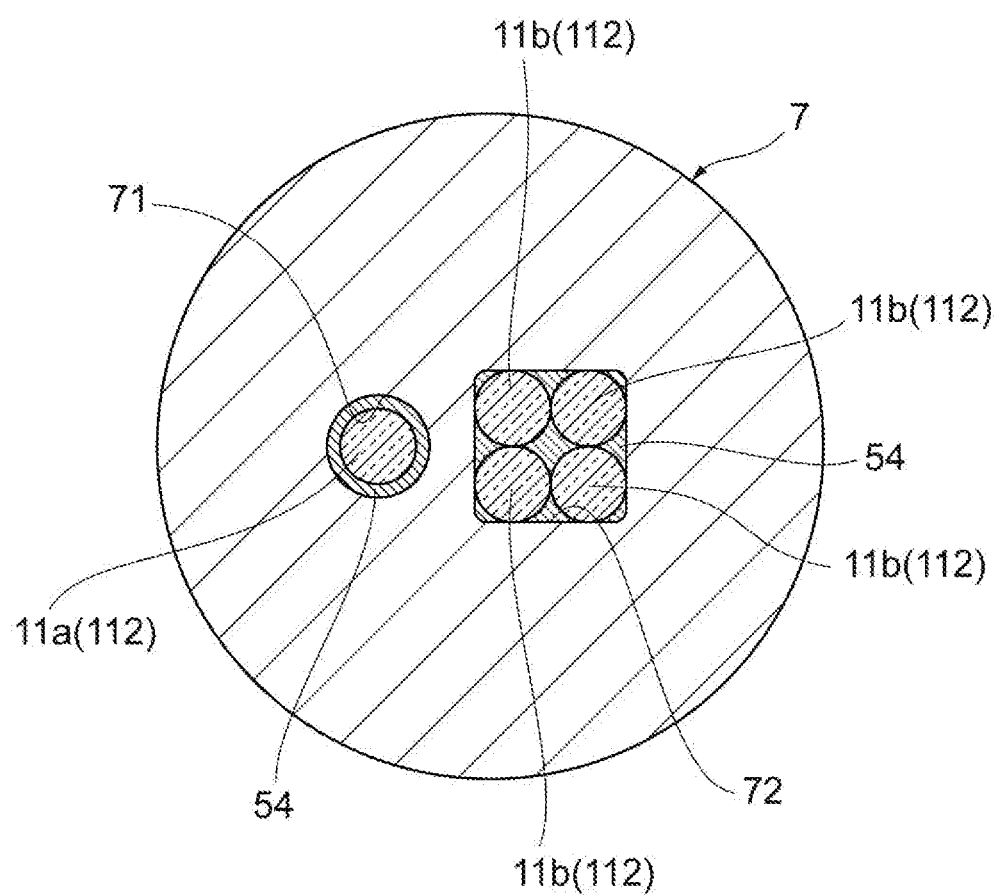
FIG. 5 is a diagram illustrating a cross section perpendicular to the extending direction of the holding unit.

Referring back to FIGS. 1 and 2, the holding unit 7 is a columnar member extending in the extending direction of the optical fibers 11. The holding unit 7 is placed between end faces 11c of the optical fibers 11 and the holding unit 5. The holding unit 7 holds the bare fiber parts 11b of the optical fibers 11. For ease of understanding, in FIG. 1, the inside of the holding unit 7 is illustrated by a solid line instead of a hidden line or a broken line. FIG. 5 is a diagram illustrating a cross section perpendicular to the extending direction of the holding unit 7. As illustrated in FIG. 5, the holding unit 7 has a hole 71 and a hole 72. The hole 71 holds the bare fiber part 11b of the optical fiber 111. The hole 72 collectively holds the bare fiber parts 11b of the optical fibers 112. The hole 72 corresponds to the third hole in the present disclosure. The hole 71 corresponds to the fourth hole in the present disclosure. The bare fiber parts 11b of the optical fibers 112 constitute one bundle, that is, a fiber bundle in the hole 72.

As illustrated in FIG. 2, the holes 71 and 72 penetrate between a front end surface 7a and a rear end surface 7b of the holding unit 7 in the extending direction. At least a part of the hole 71 and at least a part of the hole 72 such as the parts of the holes 71 and 72 near the front end surface 7a are formed apart from and independently of each other. The parts of the holes 71 and 72 near the rear end surface 7b, that is, the parts of the holes 71 and 72 near the holding unit 5 may be mutually coupled in one hole. Further, the one hole may be tapered and widened toward the rear end surface 7b. The hole 71 has, for example, a circular cross-sectional shape. The cross-sectional shape of the hole 72 is, for example, a substantially regular polygon corresponding to the number of the optical fibers 112. The cross-sectional shape of the hole 72 is substantially square in a case where the number of the optical fibers 112 is four. Here, the meaning of "substantially" includes slight deformation such as a rounded corner. The bare fiber part 11b of the optical fiber 111 is fixed to the hole 71 through an adhesive 54. The bare fiber parts 11b of the optical fibers 112 are fixed to the holes 72 through an adhesive 54. The optical fibers 111 and 112 are held in the holding unit 7 by the cladding 11e (see FIG. 3C) being fixed to the inside surfaces of the holes 71 and 72 by the adhesive 54 in the tip portion in the extending direction. The adhesive 54 is an ultraviolet-curable adhesive or a visible light-curable adhesive. In that case, the holding unit 7 may have optical transparency so that the adhesive 54 is easily irradiated with visible light or ultraviolet rays having a wavelength of, for example, 300 nm to 400 nm. The holding unit 7 is made of, for example, glass. As illustrated in FIG. 2, the adhesive 54 may protrude along the optical fibers 11 from the rear end surface 7b toward the holding unit 5.

Figure 6:
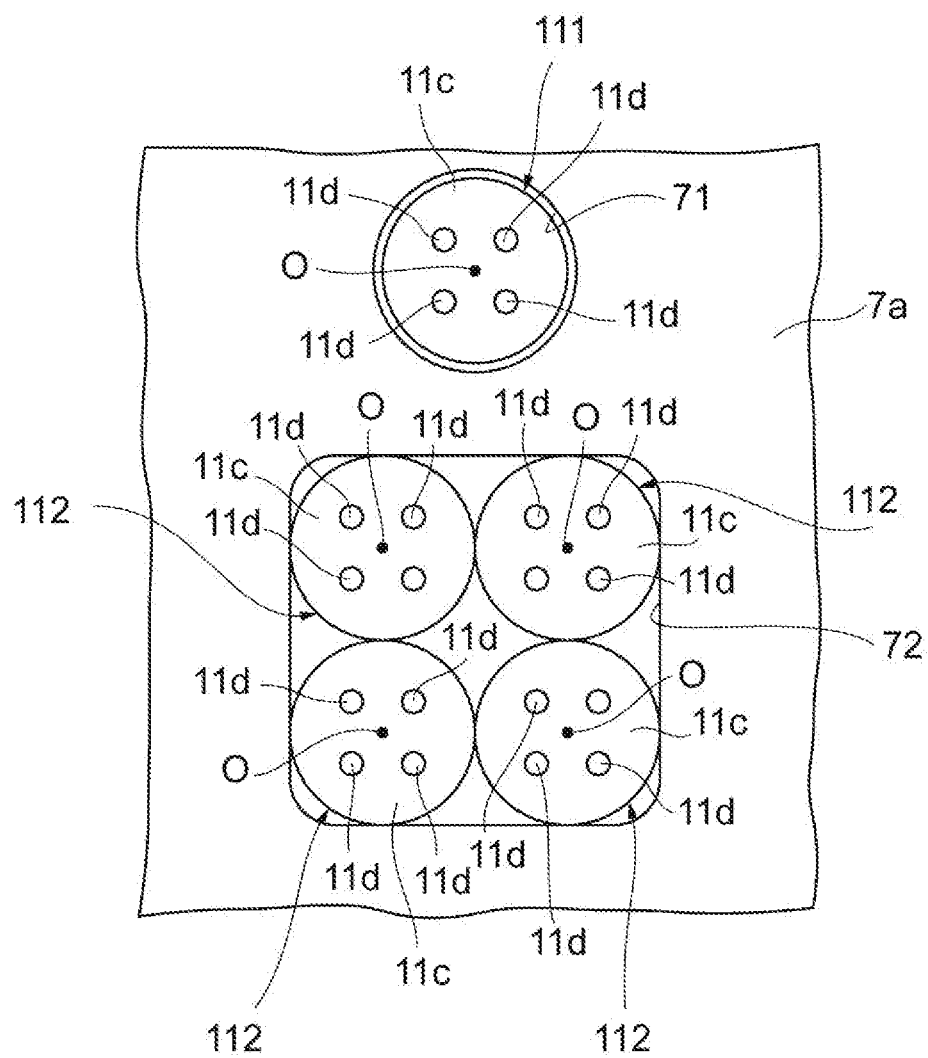
FIG. 6 is a front view illustrating the middle of a front end surface and the vicinity thereof.

Further, the holding unit 7 exposes the end faces 11c of the optical fibers 11 in the front end surface 7a. In one example, the end face 11c of each optical fiber 11 is polished and flattened together with the front end surface 7a of the holding unit 7. Further, each end face 11c is flush with the front end surface 7a. FIG. 6 is a front view illustrating the middle of the front end surface 7a and the vicinity thereof. As illustrated in FIG. 6, on the end face 11c of each optical fiber 112, the positions of the cores 11d based on the central axis O are the same as the other optical fiber 112. Further, the positions of the cores 11d on the end face 11c of the optical fiber 111 is 180° rotationally symmetrical to the positions of the cores 11d on the end face 11c of each optical fiber 112. In a case where the number of the cores 11d arranged around the central axis O, that is, the number of cores is four and the distances thereof are equal to each other, the 180° rotational symmetry is synonymous with 90° rotational symmetry and 270° rotational symmetry. Here, the angle values such as 180° should not be strictly interpreted and the meaning thereof includes a manufacturing error of, for example, approximately ±3°.

Referring back to FIGS. 1 and 2, the front end surface 5a of the holding unit 5 and the rear end surface 7b of the holding unit 7 face each other and are spaced apart from each other. As a result, a space S is provided between the front end surface 5a of the holding unit 5 and the rear end surface 7b of the holding unit 7. Further, in each of the optical fibers 11, the boundary between the coated fiber part 11a and the bare fiber part 11b, that is, the end edge of the resin 11f is positioned in the space S. In other words, the boundary between the coated fiber part 11a and the bare fiber part 11b is positioned between the front end surface 5a of the holding unit 5 and the rear end surface 7b of the holding unit 7. Accordingly, the coated fiber part 11a extends from the front end surface 5a of the holding unit 5 toward the holding unit 7. The bare fiber part 11b extends from the rear end surface 7b of the holding unit 7 toward the holding unit 5. However, the coated fiber parts 11a of the optical fibers 11 are not in contact with each other and are separated from each other in the space S.

The connecting member 9 is a member for connecting and fixing the holding unit 5 and the holding unit 7 to each other. The connecting member 9 includes a cylindrical part. In the illustrated example, the cylindrical part, that is, a tubular part forms the connecting member 9 alone. Further, a part of the holding unit 5 including the front end surface 5a is inserted or fitted in one opening 9a of the cylindrical part and is fixed to the cylindrical part through an adhesive (not illustrated). A part of the holding unit 7 including the rear end surface 7b is inserted or fitted in the other opening 9b of the cylindrical part and is fixed to the cylindrical part through the adhesive (not illustrated). For ease of understanding, in FIG. 1, the inside of the connecting member 9 is illustrated by a solid line instead of a hidden line or a broken line. The front end surface 5a of the holding unit 5 faces the rear end surface 7b of the holding unit 7 inside the connecting member 9. Accordingly, the space S is a closed space defined by the inside surface of the connecting member 9, the front end surface 5a, and the rear end surface 7b. The connecting member 9 may be made of a material such as glass or resin, for example, plastic. The adhesive between the connecting member 9 and the holding units 5 and 7 is, for example, an ultraviolet-curable adhesive or a visible light-curable adhesive. In that case, at least a part of the connecting member 9 may be light-transmissive such that visible light or ultraviolet rays having a wavelength of, for example, 300 nm to 400 nm can be transmitted.

Figure 7:
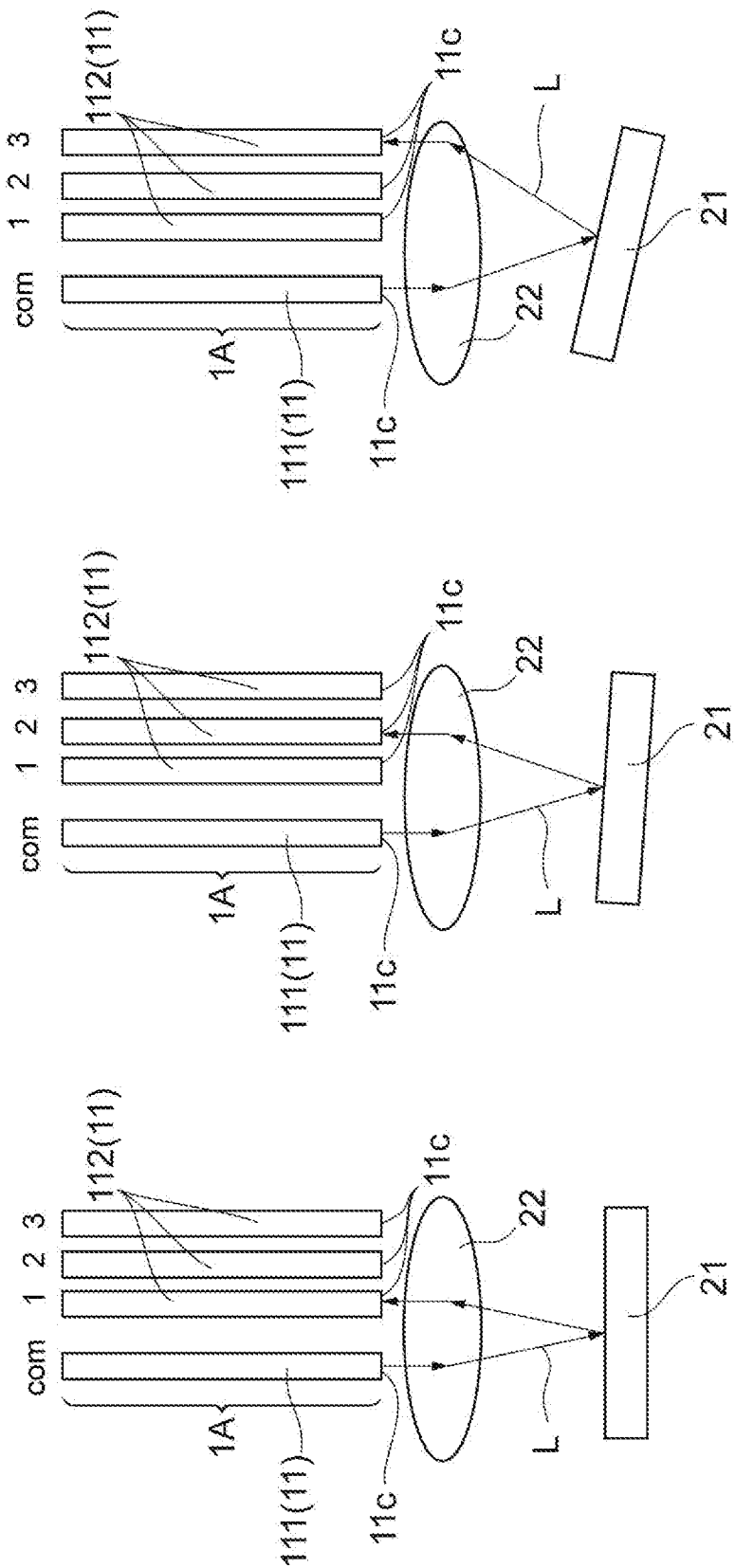
FIG. 7A is a diagram schematically illustrating the configuration of an optical switch of the embodiment.
FIG. 7B is a diagram schematically illustrating the configuration of the optical switch of the embodiment.
FIG. 7C is a diagram schematically illustrating the configuration of the optical switch of the embodiment.

The optical switch including the optical fiber module 1A of the present embodiment will be described. FIGS. 7A to 7C schematically illustrate the configuration of the optical switch of the present embodiment. This optical switch includes a plane mirror 21 and a condenser lens 22 in addition to the optical fiber module 1A. The plane mirror 21 faces the end faces 11c of the optical fibers 11 of the optical fiber module 1A. The condenser lens 22 is placed between the plane mirror 21 and the end faces 11c of the optical fibers 11.

The plane mirror 21 corresponds to the light reflection unit in the present disclosure. The plane mirror 21 is configured such that the angle of a light reflection surface around two axes orthogonal to each other is variable. In one example, the plane mirror 21 is driven by micro electro mechanical systems (MEMS). The MEMS is a device that applies a voltage to a comb-shaped silicon electrode and inclines an object by an angle corresponding to the voltage by the electrostatic attraction generated as a result of the voltage application. Then, the plane mirror 21 selectively reflects the light exited from each core 11d of the end face 11c of the optical fiber 111 as a common port, that is, a COM port toward each core 11d of the end face 11c of any one of the optical fibers 112. As illustrated in FIG. 7A, when the plane mirror 21 is inclined at a certain angle, light L exited from the optical fiber 111 is incident on one of the optical fibers 112 via the plane mirror 21. As illustrated in FIG. 7B, when the plane mirror 21 is inclined at another angle, the light L exited from the optical fiber 111 is incident on another one of the optical fibers 112 via the plane mirror 21. As illustrated in FIG. 7C, when the plane mirror 21 is inclined at yet another angle, the light L exited from the optical fiber 111 is incident on yet another one of the optical fibers 112 via the plane mirror 21. By the inclination angle of the plane mirror 21 being controlled in this manner, any of the optical fibers 112 to be coupled to the optical fiber 111 can be selected from the optical fibers 112.

Figure 8:
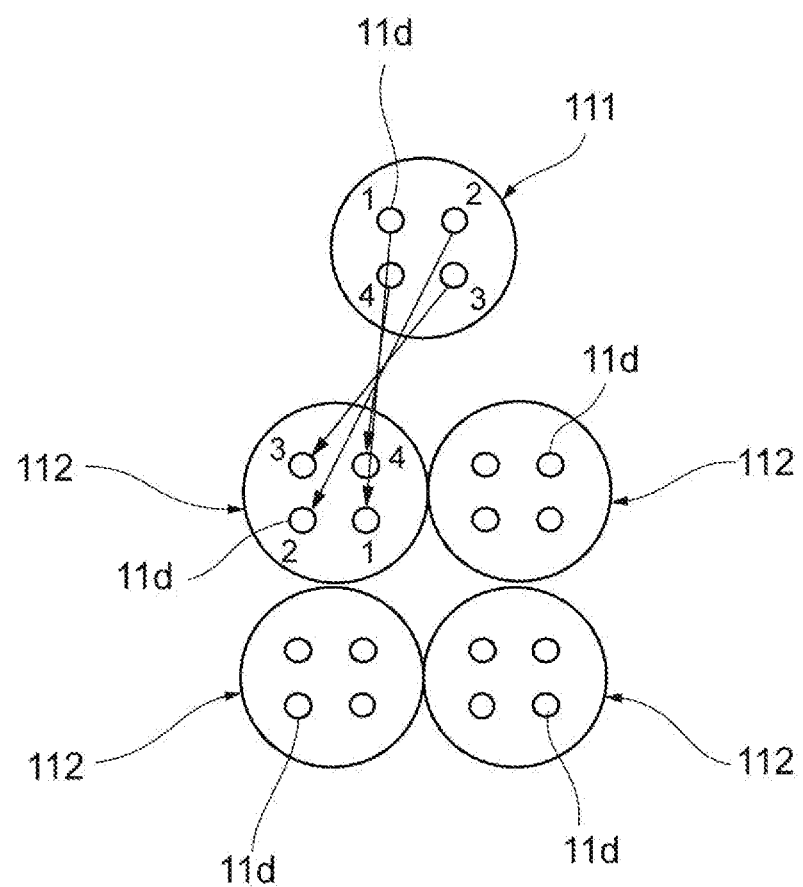
FIG. 8 is a diagram for describing optical coupling between cores included in a first optical fiber and cores included in each second optical fiber.

FIG. 8 is a diagram for describing optical coupling between the cores 11d included in the optical fiber 111 and the cores 11d included in each optical fiber 112. It is assumed that the optical fiber 111 is optically coupled to one of the four optical fibers 112 by the plane mirror 21 being maintained at a certain inclination angle. For convenience, the numbers of 1 to 4 are given to the four cores 11d of the optical fibers 111 and 112, respectively. The cores 11d having the same number are optically coupled between the optical fibers 111 and 112. As illustrated in FIG. 8, in this case, the positions of the cores 11d of the optical fiber 111 having the numbers of 1 to 4 are 180° rotationally symmetrical to the positions of the cores 11d of the optical fiber 112 having the numbers of 1 to 4. This also applies to the other optical fibers 112. In other words, as illustrated in FIG. 6, the positions of the cores 11d on the end face 11c of the optical fiber 111 are 180° rotationally symmetrical to the positions of the cores 11d on the end face 11c of each optical fiber 112 on the front end surface 7a, and thus the cores 11d of the optical fiber 111 can be suitably optically coupled to the cores 11d of the optical fiber 112.

Figure 9:
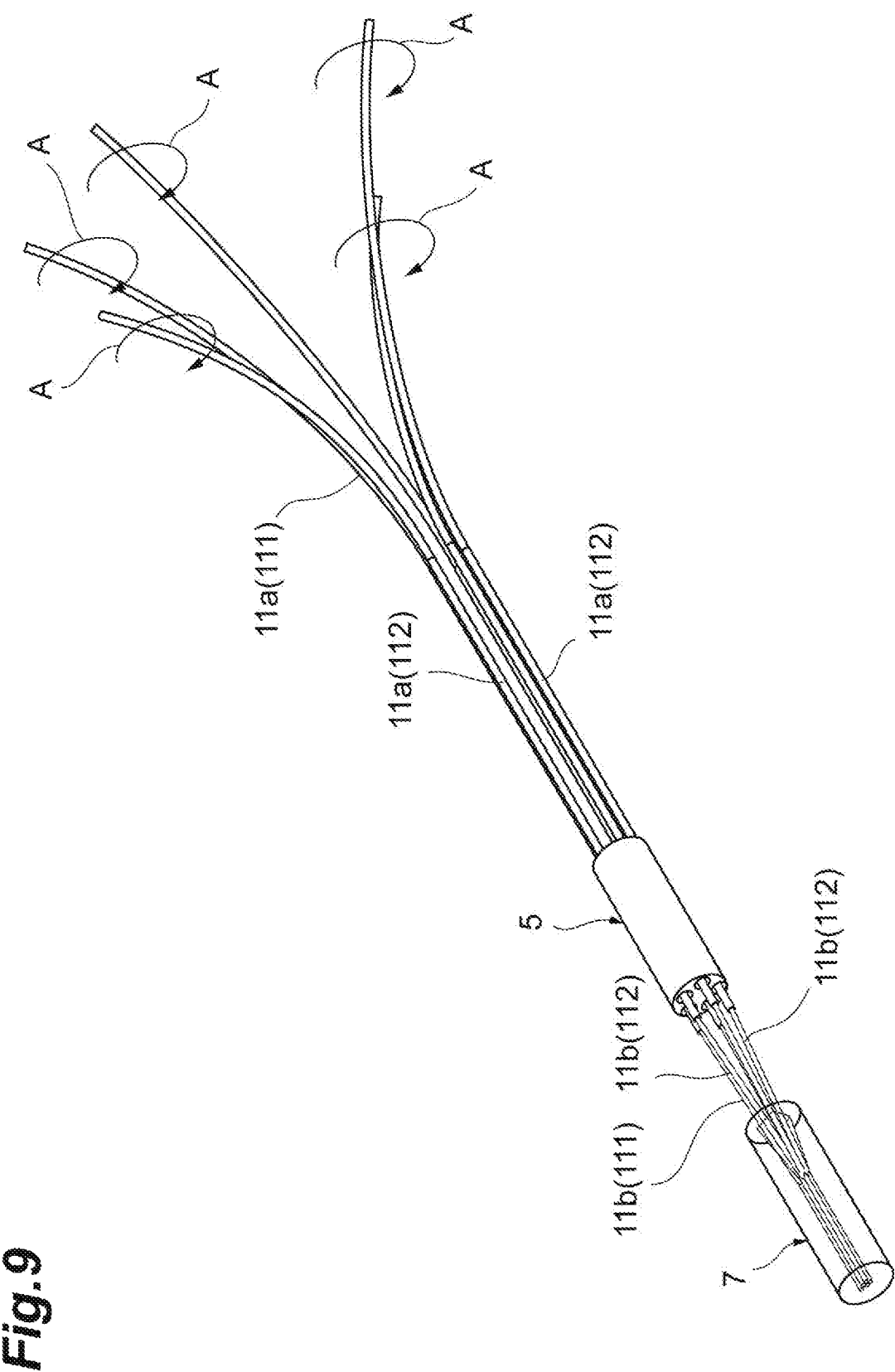
FIG. 9 is a diagram for describing a method for assembling the optical fiber module.

A method for assembling the optical fiber module 1A having the above configuration will be described with reference to FIG. 9. First, the resin 11f in the tip portions of the optical fibers 11 are removed. As a result, the optical fiber 111 having the coated fiber part 11a and the bare fiber part 11b and the optical fibers 112 having the coated fiber part 11a and the bare fiber part 11b are prepared. Next, the coated fiber part 11a of the optical fiber 111 is inserted through the hole 51 of the holding unit 5. Before the insertion, after the insertion, or at the same time as the insertion, the coated fiber parts 11a of the optical fibers 112 are inserted through the holes 52 of the holding unit 5, respectively. At this time, the adhesive 53 is not yet injected into the holes 51 and 52. Next, the bare fiber part 11b of the optical fiber 111 is inserted through the hole 71 of the holding unit 7. Before the insertion, after the insertion, or at the same time as the insertion, the bare fiber parts 11b of the optical fibers 112 are inserted through the hole 72 of the holding unit 7. At this time, the adhesive 54 is not yet injected into the holes 71 and 72.

Then, the rotation angle of each of the optical fibers 111 and 112 is adjusted (see the arrow A in the drawing) while the end face 11c of each of the optical fibers 111 and 112 is observed by a camera. At this time, the positions of the cores 11d of each optical fiber 112 are made 180° rotationally symmetrical with respect to the positions of the cores 11d of the optical fiber 111. After the adjustment is completed, the holes 71 and 72 are filled with the adhesive 54 and the adhesive 54 is cured. Then, the holes 51 and 52 are filled with the adhesive 53 and the adhesive 53 is cured. Further, the connecting member 9 is fixed to the holding units 5 and 7. Finally, the front end surface 7a of the holding unit 7 and the end faces 11c of the optical fibers 111 and 112 are polished and flattened. The assembly of the optical fiber module 1A is completed in this manner.

Figure 10:
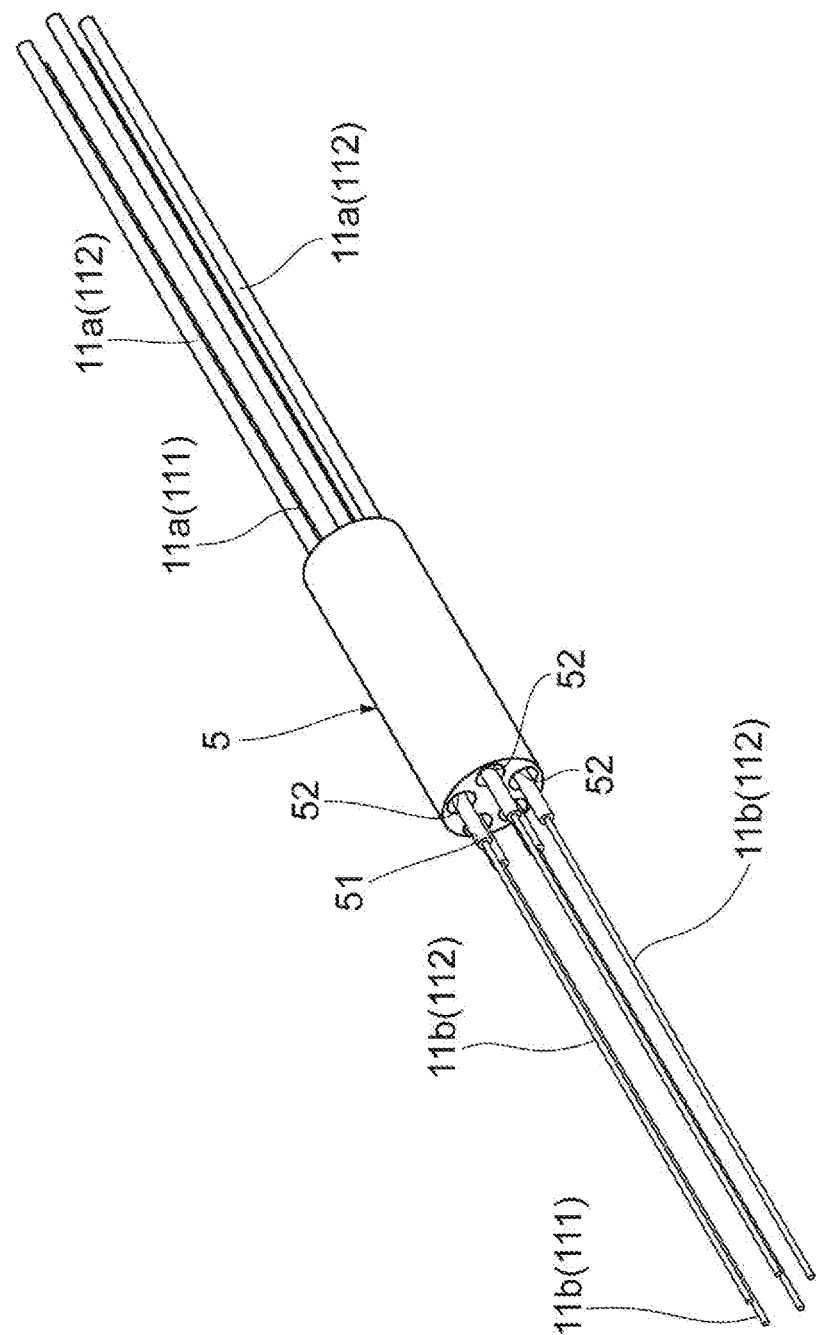
FIG. 10 is a diagram for describing another method for assembling the optical fiber module.
Figure 11:
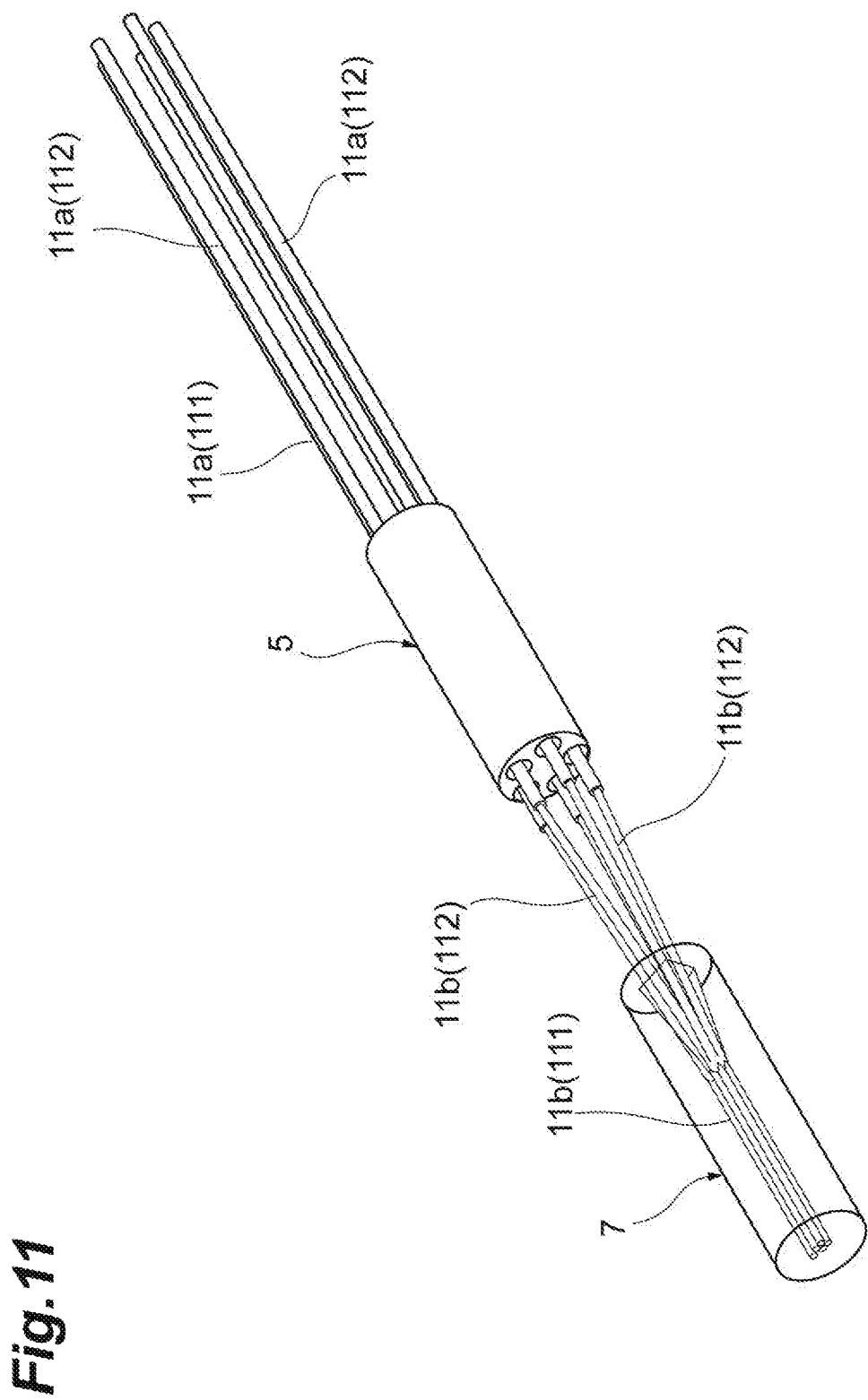
FIG. 11 is a diagram for describing another method for assembling the optical fiber module.

FIGS. 10 and 11 are diagrams for describing another method for assembling the optical fiber module 1A. First, the optical fiber 111 having the coated fiber part 11a and the bare fiber part 11b and the optical fibers 112 having the coated fiber part 11a and the bare fiber part 11b are prepared as in the method described above. Next, as illustrated in FIG. 10, the coated fiber part 11a of the optical fiber 111 is inserted through the hole 51 of the holding unit 5. Before the insertion, after the insertion, or at the same time as the insertion, the coated fiber parts 11a of the optical fibers 112 are inserted through the holes 52 of the holding unit 5, respectively. At this time, the adhesive 53 is not yet injected into the holes 51 and 52. Then, the rotation angle of each of the optical fibers 111 and 112 is adjusted while the end face 11c of each of the optical fibers 111 and 112 is observed by a camera. At this time, the positions of the cores 11d of each optical fiber 112 are made 180° rotationally symmetrical with respect to the positions of the cores 11d of the optical fiber 111. After the adjustment is completed, the holes 51 and 52 are filled with the adhesive 53. In a case where the rotation angles of the optical fibers 111 and 112 deviate due to the filling with the adhesive 53, the rotation angles are readjusted. Then, the adhesive 53 is cured.

Then, as illustrated in FIG. 11, the bare fiber part 11b of the optical fiber 111 is inserted through the hole 71 of the holding unit 7. Before the insertion, after the insertion, or at the same time as the insertion, the bare fiber parts 11b of the optical fibers 112 are inserted through the hole 72 of the holding unit 7. Then, the holes 71 and 72 are filled with the adhesive 54 and the adhesive 54 is cured. Further, the connecting member 9 is fixed to the holding units 5 and 7. Finally, the front end surface 7a of the holding unit 7 and the end faces 11c of the optical fibers 111 and 112 are polished and flattened. The assembly of the optical fiber module 1A is completed in this manner.

It should be noted that the rotation angles of the optical fibers 111 and 112 may deviate in the assembly process after the adhesive 53 is cured in this assembly method. This is because the cladding 11e of each of the optical fibers 111 and 112 is not in close contact with the resin 11f. In a case where the glass cladding 11e is not in close contact with the resin 11f, the rotation angle of the cladding 11e may deviate even with the resin 1 if fixed to the hole 51 or 52 by the adhesive 53.

Figure 12:
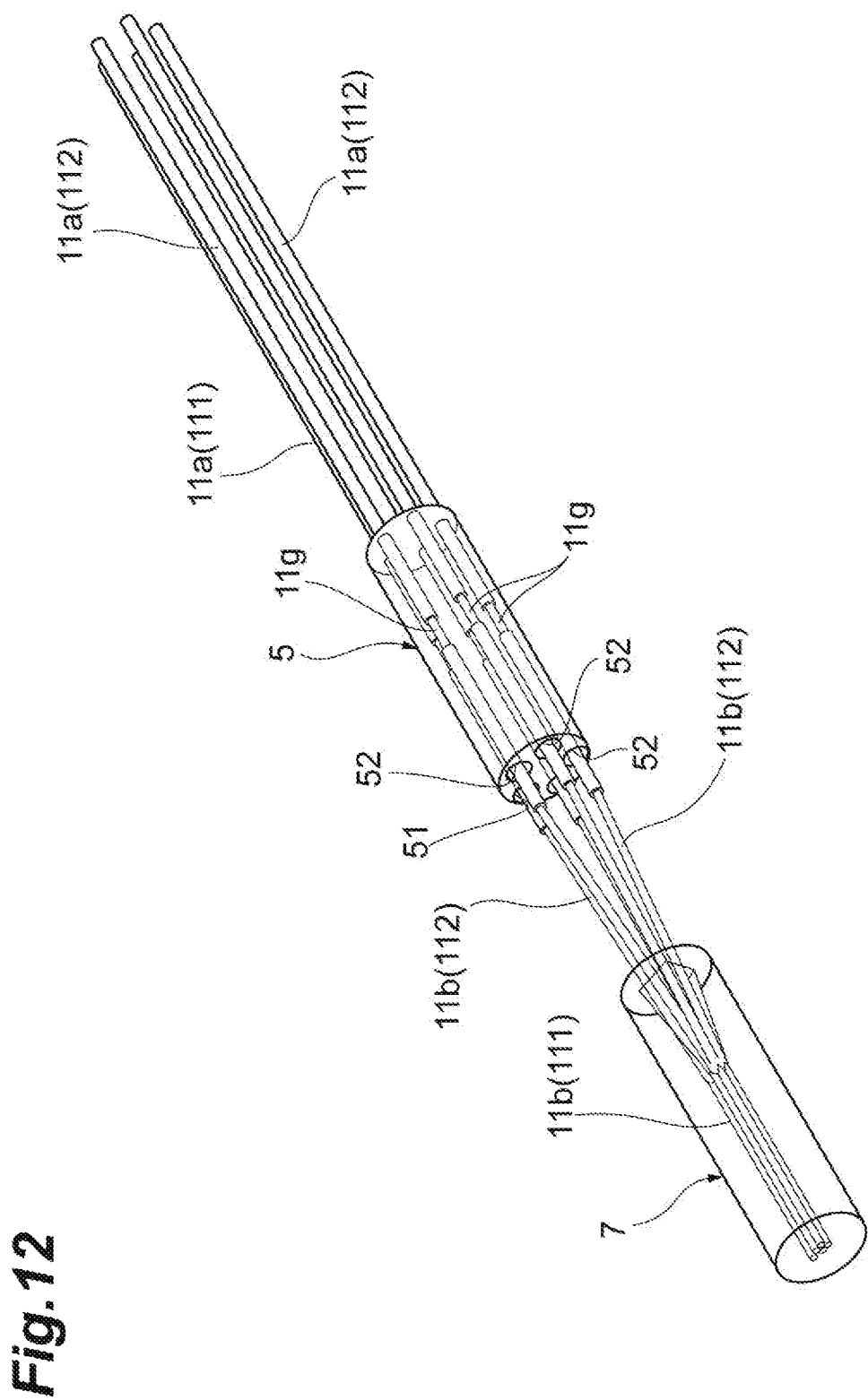
FIG. 12 is a perspective view illustrating a state where each optical fiber is provided with a part where the outer surface of a cladding is exposed from a resin, and the part of the optical fiber is placed in the hole.

In order to solve such a problem, each of the optical fibers 111 and 112 may be provided with, for example, a part 11g, that is, a third part as illustrated in FIG. 12. The outer surface of the cladding 11e of the part 11g is exposed from the resin 11f. The part 11g of the optical fiber 111 is placed in the hole 51. The parts 11g of the optical fibers 112 are placed in the holes 52, respectively. In this case, the outer surface of the cladding 11e of each of the optical fibers 111 and 112 can be fixed to the hole 51 or 52 not by the resin 11f but directly. Accordingly, the position of each core 11d can be reliably fixed regardless of a shortage of close contact between the resin 11f and the cladding 11e. Laser light such as $CO_2$ laser and YAG laser may be used when the resin 11f is removed at each part 11g. In that case, it is possible to prevent the end of the resin 11f from being rough and smoothly rotating of the optical fibers 111 and 112 in the holes 51 and 52 can be possible as compared with a case where a mechanical cleaver is used.

Effects obtained by means of the optical fiber module 1A according to the present embodiment described above will be described. In this optical fiber module 1A, the optical fibers 11 are held in the holes 51 and 52, which are independent in the holding unit 5. Further, the boundary between the coated fiber part 11a coated with the resin 11f and the bare fiber part 11b where the cladding 11e is exposed from the resin 11f is positioned in the space S provided between the holding unit 5 and the holding unit 7. Further, in the space S, the coated fiber part 11a of the optical fiber 111 is separated from the coated fiber parts 11a of the optical fibers 112, and the coated fiber parts 11a of the optical fibers 112 are separated from each other. Accordingly, it is possible to avoid contacting between the adjacent fibers. Otherwise, adjusted optical fiber 111 or 112 would be rotated due to the friction between the resin 11f having a high coefficient of friction when the rotation angles of the optical fibers 111 and 112 are adjusted. Accordingly, the work of individually adjusting the rotation angles of the optical fibers 111 and 112 can be facilitated. In addition, the bare fiber parts 11b are collectively held in one hole 72 in the holding unit 7. Accordingly, it is possible to realize a larger number of channels by reducing the distances between the cores 11d of the optical fibers 112 and arranging a large number of cores 11d in a narrow area. Alternatively, the angle range of the plane mirror 21 can be reduced and it is possible to reduce the electric power voltage that is required to drive the plane mirror 21.

Further, in this optical fiber module 1A, the positions of the cores 11d on the end face 11c of the optical fiber 111 are 180° rotationally symmetric to the positions of the cores 11d on the end face 11c of each optical fiber 112. As a result, optical switching can be suitably operated by the cores 11d of the optical fiber 111 and the cores 11d of each optical fiber 112 corresponding to each other.

In optical communication networks in recent years, a large amount of traffic signals including Internet signals are transmitted and received. Accordingly, the communication by many users is substantially affected in the event of, for example, transceiver device malfunction or transmission line disconnection attributable to a disaster or the like. In this regard, a plurality of inter-base-station of optical fiber transmission lines are prepared and made redundant for the purpose of enhancing the reliability of an optical communication network. In a case where a network fault occurs in an optical fiber transmission line, the line is switched to a spare optical fiber transmission line. The optical switch is used for such optical fiber transmission line switching. By configuring an optical switch by means of an MCF having a plurality of cores as in the present embodiment, it is possible to realize a plurality of optical switches of the related art with one optical switch. Accordingly, it is possible to simplify communication equipment and save space.

As in the present embodiment, the optical fiber module 1A may include the connecting member 9 that connects the holding unit 5 to the holding unit 7. In this case, the space S between the holding unit 5 and the holding unit 7 can be easily formed. The holding unit 5 may be inserted and fixed in one opening 9a of the tubular part of the connecting member 9. The holding unit 7 may be inserted and fixed in the other opening 9b of the tubular part of the connecting member 9. In this case, the space S between the holding unit 5 and the holding unit 7 can be surrounded by the tubular part. Accordingly, it is possible to effectively protect the optical fibers 111 and 112 arranged in the space S, particularly the bare fiber part 11b with the cladding 11e exposed from the resin 11f.

As in the present embodiment, the holding unit 5 may have optical transparency. Further, the adhesive 53 applied between the optical fiber 111 and the hole 51 and between the optical fibers 112 and the holes 52 may be an ultraviolet-curable adhesive or a visible light-curable adhesive. In this case, the adhesive 53 can be irradiated with ultraviolet rays or visible light through the holding unit 5. Accordingly, the optical fibers 111 and 112 can be easily bonded and fixed in the holes 51 and 52, respectively.

As in the present embodiment, the holding unit 7 may have optical transparency. Further, the adhesive 54 applied between the optical fiber 111 and the hole 71 and between the optical fibers 112 and the holes 72 may be an ultraviolet-curable adhesive or a visible light-curable adhesive. In this case, the adhesive 54 can be irradiated with ultraviolet rays or visible light through the holding unit 7. Accordingly, the optical fibers 111 and 112 can be easily bonded and fixed in the holes 71 and 72, respectively.

Modification Example

Figure 13:
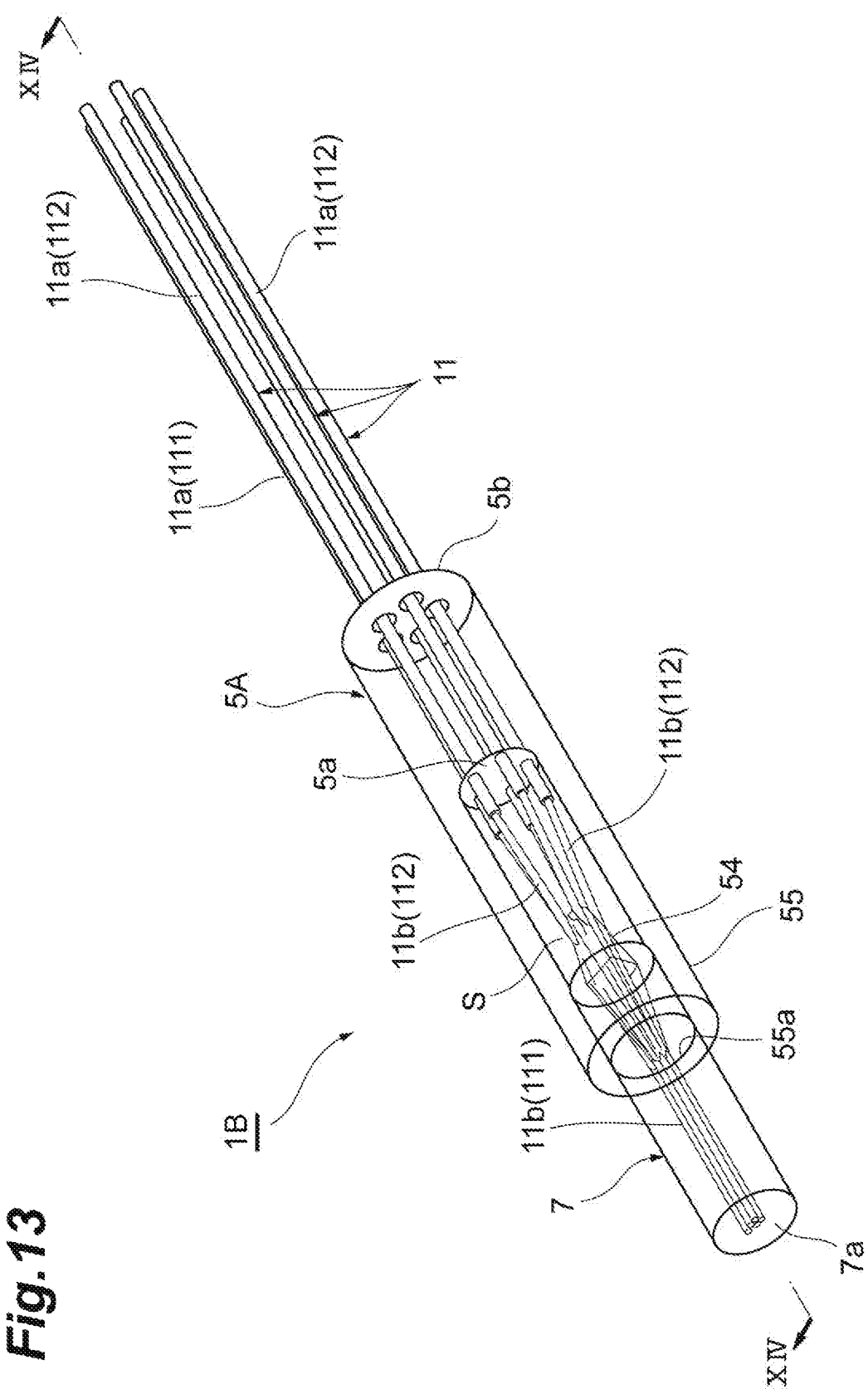
FIG. 13 is a perspective view illustrating the appearance of an optical fiber module according to a modification example.
Figure 14:
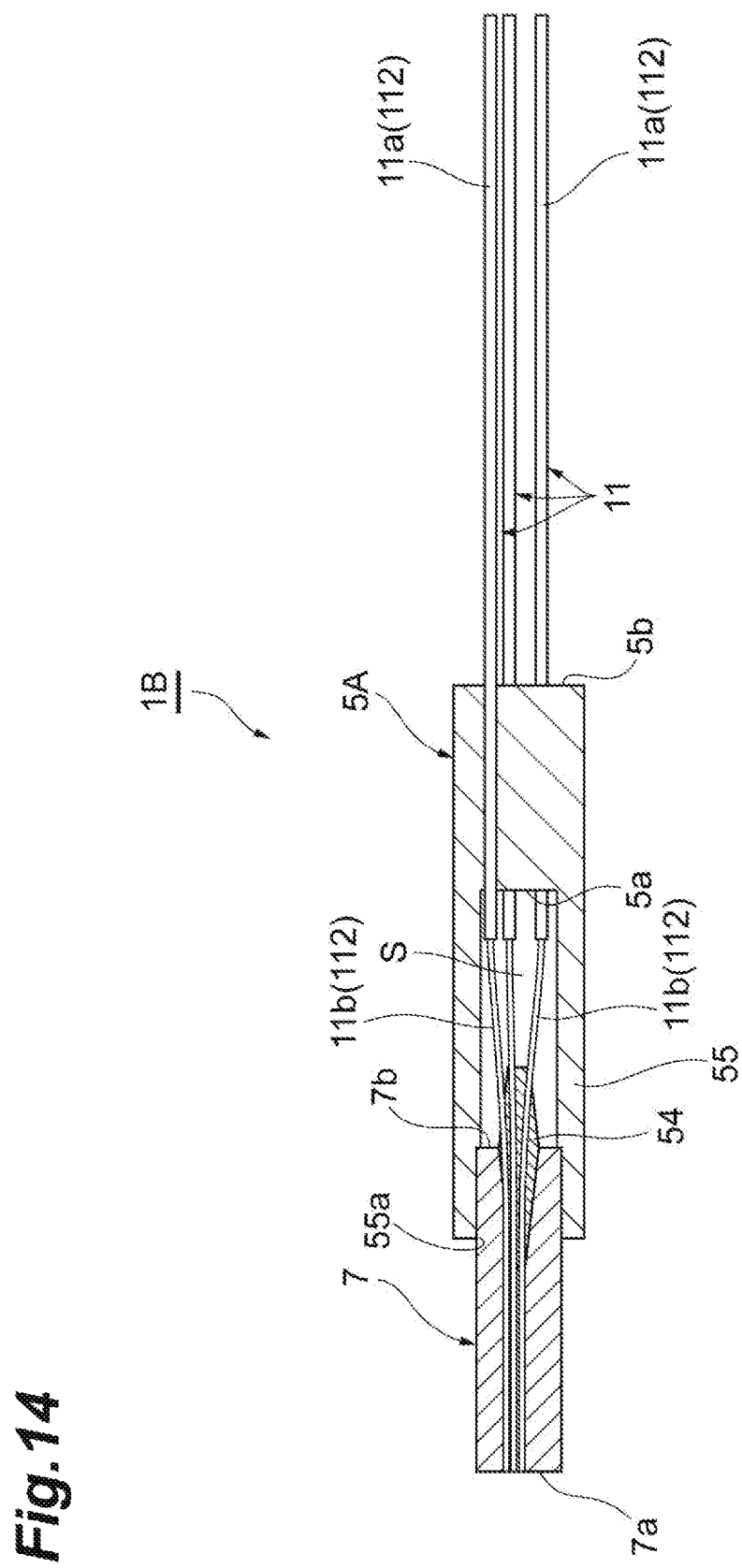
FIG. 14 is a cross-sectional view taken along line XIV-XIV illustrated in FIG. 13 and illustrates a cross section of the optical fiber module along the extending direction of the optical fibers.

FIG. 13 is a perspective view illustrating the appearance of an optical fiber module 1B according to a modification example of the embodiment described above. FIG. 14 is a cross-sectional view taken along line XIV-XIV illustrated in FIG. 13. FIG. 14 illustrates a cross section of the optical fiber module 1B along the extending direction of the optical fibers 11. As illustrated in FIGS. 13 and 14, the optical fiber module 1B includes the optical fibers 11, a holding unit 5A, and the holding unit 7. The configurations of the optical fibers 11 and the holding unit 7 are similar to those in the embodiment described above. The holding unit 5A corresponds to the first holding unit in the present disclosure.

The holding unit 5A of this modification example has a connecting part 55 for connection to the holding unit 7 in addition to the configuration of the holding unit 5 of the embodiment described above. The connecting part 55 protrudes from the front end surface 5a of the holding unit 5A toward the holding unit 7 and has a cylindrical shape surrounding the space S. In other words, the holding unit 5A has a configuration in which the holding unit 5 and the connecting member 9 of the embodiment described above are integrated. Further, a part of the holding unit 7 including the rear end surface 7b is inserted in an opening 55a of the connecting part 55 and is fixed to the connecting part 55 through an adhesive (not illustrated).

As in this modification example, the holding unit 5A may have the connecting part 55 for connection to the holding unit 7. Also in this case, the space S between the holding unit 5A and the holding unit 7 can be easily formed. As in this modification example, the connecting part 55 may have a tubular shape surrounding the space S and the holding unit 7 may be inserted and fixed in the opening 55a of the connecting part 55. In this case, the space S between the holding unit 5A and the holding unit 7 can be surrounded by the connecting part 55. Accordingly, it is possible to effectively protect the optical fibers 111 and 112 arranged in the space S, particularly the bare fiber part 11b with the cladding 11e exposed from the resin 11f.

The optical fiber module and the optical switch according to the present disclosure are not limited to the above-described embodiment and modification example, and various modifications can be made. For example, although a case where each optical fiber 11 has four cores 11d has been exemplified in the above-described embodiment, the number of the cores 11d of each optical fiber 11 may be two, three, or five or more. The form in which the first holding unit and the second holding unit are connected is not limited to the above-described embodiment and modification example, and various other forms can be adopted.

What is claimed is:

1. An optical fiber module comprising:
a first optical fiber as a multi-core optical fiber;
a plurality of second optical fibers as multi-core optical fibers extending along the first optical fiber;
a first holding unit having a first hole holding the first optical fiber through an adhesive and second holes respectively holding the second optical fibers through an adhesive, the first hole being independent of the second holes, the second holes being independent of each other; and
a second holding unit placed between the first holding unit and end faces of the first and second optical fibers, holding the first optical fiber and the second optical fibers, and exposing the end faces of the first and the second optical fibers at one end, wherein
the second holding unit has a third hole collectively holding the second optical fibers through an adhesive,
each of the first and second optical fibers has a first part and a second part positioned between the end face and the first part, an outer surface of a cladding of the first part is coated with a resin, an outer surface of a cladding of the second part exposed from the resin, the first holding unit holds the first part, and the second holding unit holds the second part,
a space is provided between the first holding unit and the second holding unit, a boundary between the first part and the second part is positioned in the space, the first part of the first optical fiber is separated from the first parts of the second optical fibers in the space, and the first parts of the second optical fibers are separated from each other in the space, and
positions of the cores of the first optical fiber on the end face are 180° rotationally symmetrical to positions of the cores of each of the second optical fibers on the end face.

2. The optical fiber module according to claim 1, further comprising a member interconnecting the first holding unit and the second holding unit.

3. The optical fiber module according to claim 2, wherein
the member includes a tubular part, and
the first holding unit is inserted and fixed in one opening of the tubular part and the second holding unit is inserted and fixed in the other opening of the tubular part.

4. The optical fiber module according to claim 1, wherein the first holding unit further has a connecting part to connect with the second holding unit.

5. The optical fiber module according to claim 4, wherein the connecting part has a tubular shape surrounding the space, and the second holding unit is inserted and fixed in an opening of the connecting part.

6. The optical fiber module according to claim 1, wherein
each of the first and second optical fibers further has a third part,
an outer surface of a cladding of the third part is exposed from the resin,
the third part of the first optical fiber is positioned in the first hole, and
the third part of the second optical fiber is positioned in the second hole.

7. The optical fiber module according to claim 1, wherein
the first holding unit has optical transparency, and
the adhesive applied between the first optical fiber and the first hole and between the second optical fibers and the second holes is an ultraviolet-curable adhesive or a visible light-curable adhesive.

8. The optical fiber module according to claim 1, wherein
the second holding unit has optical transparency, and
the adhesive applied between the second optical fibers and the third hole is an ultraviolet-curable adhesive or a visible light-curable adhesive.

9. The optical fiber module according to claim 1, wherein
the second holding unit has a fourth hole holding the first optical fiber through an adhesive, and
the third hole and the fourth hole are independent of each other at least in part.

10. The optical fiber module according to claim 1, wherein
the second holding unit has a fourth hole holding the first optical fiber through an adhesive, and
parts of the third hole and the fourth hole close to the first holding unit are coupled to each other in one hole.

11. The optical fiber module according to claim 10, wherein the one hole is tapered and widened toward an end surface of the second holding unit facing the first holding unit.

12. The optical fiber module according to claim 1, wherein the adhesive of the third hole protrudes from an end surface of the second holding unit facing the first holding unit toward the first holding unit along the first and second optical fibers.

13. The optical fiber module according to claim 1, wherein the first hole is apart from the second holes and the second holes are apart from each other.

14. The optical fiber module according to claim 9, wherein the third hole and the fourth hole are apart from each other at least in part.

15. An optical switch comprising:

the optical fiber module according to claim 1; and a light reflection unit configured to be variable in angle and selectively reflecting light exited from each core on the end face of the first optical fiber toward each core on the end face of any one of the second optical fibers.

16. The optical switch according to claim 15, further comprising a condenser lens placed between the light reflection unit and the end faces of the first and second optical fibers.

* * * * *